United States Patent [19]

Jung et al.

[11] 4,308,354
[45] Dec. 29, 1981

[54] MAKING IMPACT RESISTANT POLYMERS

[75] Inventors: Karl A. Jung, Nieder-Ramstadt; Manfred Munzer, Bensheim; Heinz Vetter; Winfried Wunderlich, both of Rossdorf, all of Fed. Rep. of Germany

[73] Assignee: Röhm GmbH, Darmstadt, Fed. Rep. of Germany

[21] Appl. No.: 226,008

[22] Filed: Jan. 19, 1981

[30] Foreign Application Priority Data

Jan. 24, 1980 [DE] Fed. Rep. of Germany ....... 3002394

[51] Int. Cl.$^3$ .............................................. C08L 51/04
[52] U.S. Cl. ....................................... 525/84; 525/80; 525/261; 525/262; 525/263; 525/310
[58] Field of Search ................. 525/261, 263, 310, 80, 525/84, 262

[56] References Cited

U.S. PATENT DOCUMENTS

| | | | |
|---|---|---|---|
| 2,857,360 | 10/1958 | Feuer | 525/310 |
| 3,261,887 | 7/1966 | Mann | 525/84 |
| 3,428,712 | 2/1969 | Carrock et al. | 525/243 |
| 3,868,434 | 2/1975 | Westphal et al. | 525/304 |
| 4,085,166 | 4/1978 | Di Leone et al. | 525/86 |

FOREIGN PATENT DOCUMENTS

| | | |
|---|---|---|
| 640832 | of 0000 | Belgium . |
| 1222251 | of 0000 | Fed. Rep. of Germany . |
| 1255304 | of 0000 | Fed. Rep. of Germany . |
| 1595203 | of 0000 | Fed. Rep. of Germany . |
| 1595210 | of 0000 | Fed. Rep. of Germany . |
| 850458 | 10/1960 | United Kingdom . |
| 1027326 | 4/1966 | United Kingdom . |
| 1030943 | 5/1966 | United Kingdom . |
| 1039728 | 8/1966 | United Kingdom . |
| 1389491 | 3/1975 | United Kingdom . |

*Primary Examiner*—J. Ziegler
*Attorney, Agent, or Firm*—Curtis, Morris & Safford

[57] ABSTRACT

What is disclosed are a method for making a transparent impact-resistant polymer comprising a rubbery phase of grafted polybutadiene and a hard copolymer phase, which polymer is adaptable to use as a molding material, which method comprises:

(1) in a first polymerization stage, dissolving a solid polybutadiene rubber in a monomer mixture comprising (a) methyl methacrylate, (b) styrene, and (c) at least one of methyl acrylate or ethyl acrylate to give a solution containing from 3 to 10 percent by weight of said rubber, and then polymerizing the solution using an initiator promoting graft copolymerization and in the presence ab initio of a chain transfer agent until an amount of said monomer mixture which is one to two times the weight of said polybutadiene rubber introduced is converted, said monomers (a), (b), and (c) being present in said monomer mixture in a ratio by weight of $(73\pm5):(22\pm2):(5\pm3)$ such that the index of refraction of the hard polymer phase produced by the polymerization is equal to that of said polybutadiene, and said initiator being one forming tertiary-butoxy or phenyl free-radicals on decomposition;

(2) in a second stage, further polymerizing to a monomer conversion between 25 and 40 percent while stirring to subject the resulting polymer to shear forces producing polymer particles having an average diameter between 0.2 micron and 1.5 microns; and (3) in a third stage, further polymerizing to a monomer conversion greater than 80 percent, and polymers made by such a method.

9 Claims, No Drawings

MAKING IMPACT RESISTANT POLYMERS

The present invention relates to a method for making transparent, impact resistant polymers, suitable for use as molding compounds, and to the polymers so made. More in particular, the polymers comprise terpolymers of methyl methacrylate, styrene, and alkyl acrylates admixed with grafted polybutadiene.

Molding materials comprising methyl methacrylate-styrene copolymers admixed with a grafted polybutadiene have long been known in the art. The prior art describes emulsion polymers of styrene and acrylate and/or methacrylate monomers (e.g. methyl methacrylate, ethyl acrylate, and styrene) and a polybutadiene-styrene latex, wherein the refractive index of the acrylate or methacrylate copolymer should be equalized with that of the latex.

In other prior art, molding materials comprising polymethyl methacrylate or copolymers comprising at least 40 percent methyl methacrylate and/or styrene are claimed.

Still other prior art describes a molding material comprising 65 to 85 percent by weight of a member selected from the group consisting of methyl methacrylate and mixtures of at least 55 percent by weight of methyl methacrylate with another vinylic monomer, which member is polymerized in intimate contact with a butadiene-styrene latex comprising 50 to 90 percent by weight of butadiene. As a comonomer for methyl methacrylate, ethyl acrylate is mentioned inter alia.

Other prior art describes molding materials comprising 1 to 20 percent by weight of polybutadiene together with 80 to 99 percent by weight of a copolymer of at least one aromatic vinyl compound and one acrylic acid ester or methacrylic acid ester.

Further, formable monovinyl aromatic polymers, prepared by the polymerization of at least one vinyl aromatic monomer together with 0 to 30 percent by weight of a comonomer such as an acrylic acid ester or methacrylic acid ester and 1,4-polybutadiene-rubber, are known from still other prior art. According to this art, the rubber is dissolved in the monomers and is polymerized free radically in bulk with stirring until polymerization is concluded. The amount of the rubber should be 1 to 20 percent, by weight of the total polymer.

A two-step graft polymerization method is the subject of still further prior art. In a first stage, a monovinyl aromatic monomer is prepolymerized with agitation in the presence of a rubber dissolved therein until the entire rubber phase leaves the solution and the rubber particles have an average particle size of at least 0.5 micron and less than 10 microns, and is then further polymerized until the desired conversion is obtained.

A method for the preparation of rubber-modified polymers is also described in the art, in which method a solution of a linear polybutadiene in a monovinyl aromatic hydrocarbon, optionally together with acrylonitrile or methyl methacrylate, is prepolymerized in the presence of an alkyl mercaptan having 6 to 24 carbon atoms as a chain transfer agent until a conversion of about 10 to 45 percent is obtained. Then, the reaction mixture is subjected to a second polymerization step until there is substantially complete polymerization. The chain transfer agent is added in 2 to 4 separate portions.

It is evident from this art that the method which it claims is to be viewed as relating to the preparation of terpolymers, especially of the ABS-type. It is also evident from this last-mentioned art that the claimed method leads to improved properties in the liquid melt of the products produced thereby (rubber-modified styrene or ABS-polymers), without impairment of the impact resistance, but only if polybutadiene rubber is employed and not, however, styrene-butadiene rubber. As concerns the addition of mercaptan, it is taught that the exact times and places depend on the method chosen and on the properties desired in the product. The prepolymerization step is carried out to a degree of conversion of, preferably, 15 to 35 percent. In the subsequent second polymerization step, polymerization should be carried out in the absence of shearing or agitation.

Further prior art teaches acrylic molding materials which comprise (A) about 70 to 95 percent by weight of a resinous terpolymer comprising about 65 to 75 parts of methyl methacrylate, 18 to 24 parts of styrene, and about 2 to 12 parts of ethyl acrylate together with (B) about 5 to 30 percent of polybutadiene which is graft polymerized with 17 to 22 parts of methyl methacrylate, 4 to 7 parts of styrene, and 0 to 3 parts of ethyl acrylate. The ratio by weight of polybutadiene to monomer in component (B) is from 1:1 to about 4:1.

Still other prior art describes a method for the preparation of transparent, rubber-modified synthetic resins which is characterized by a first-stage polymerization, without a chain transfer agent, which proceeds to a vinyl monomer conversion of 3.5 to 15 percent by weight. Thereafter, a chain transfer agent is added and the batch is polymerized further in bulk to a vinyl monomer conversion of 20 to 40 percent by weight. Subsequently, 0.3 to 3 percent of lauroyl peroxide, by weight of the total amount of vinyl monomers, is added.

At the present time, the preparation of methyl methacrylate-polybutadiene-styrene polymers according to the methods of the state of the art which are performed in practice proceeds in each case from a rubber in latex form. When latices are used, their water content has a disadvantageous effect from the point of view of transportation and storage. Isolation of the latex particles can be either by coagulation or by removal of water by evaporation. However, as a rule the former cannot be carried out with 100 percent recovery and thus leads to waste water pollution, while the latter unavoidably leads to the presence of foreign components from the latex in the impact resistant forming material.

These foreign components (emulsifiers, decomposition products of the initiator system) can be completely undesirable for further working up. Thus, molding materials having a latex base cannot be fully satisfactory. For example, difficulties such as odor formation, susceptibility to hairline cracking, and insufficient optical quality occur.

The alternative—known from the preparation of impact resistant polystyrene—namely, working with solid rubber, has until now not been able to find an entry into the field of methyl methacrylate-butadiene-styrene polymers (MBS polymers), evidently because of the different graftability onto the polybutadiene of the methyl methacrylate present as the principal monomer and because of the difficulties associated therewith in adjusting the particle size of the rubbery phase, which latter is decisive for the product properties which are being striven for, particularly optical quality and impact strength.

According to a newly disclosed state of the art, it is evident that very narrowly formulated process characteristics are required in this field in order to obtain molding materials which are at all able to be used. The inherent decomposition characteristics of lauroyl peroxide, the sole initiator recommended in one piece of prior art discussed above, decisively limit the choice of conceivable methods because the method parameters are extensively defined by the choice of initiator. In the same way, the requirement that polymerization must be carried out to a conversion between 3.5 to 15 percent in the absence of chain transfer agents works limitatively. In order to prevent the formation, within this conversion region, of polymers having a high molecular weight which negatively influences their workability and optical qualities, a choice of the amount of initiator and of the polymerization temperature must be made within narrow limits.

Thus, the problem existed of making available a generally useful method for the preparation of impact resistant molding materials having improved product quality, particularly of low-odor products, which materials meet optical requirements without suffering an impairment of their mechanical properties.

This problem has been solved by the method described and claimed herein. Namely, in a series of method measures exactly correlated with one another, a polybutadiene solid rubber is dissolved in amounts from 3 to 10 percent by weight in a mixture containing monomeric methyl methacrylate, styrene, and methyl acrylate and/or ethyl acrylate in a weight ratio of $(73\pm5):(22\pm2):(5\pm3)$. (The ratio in every case is so chosen that the index of refraction of the resulting hard phase is equalized with that of the polybutadiene). Graft-active initiators which form tert.-butyloxy or phenyl radicals on decomposition are added and the polymerization is carried out in the presence, ab initio, of a chain transfer agent until a conversion is reached which corresponds with from one to two times the amount by weight of the polybutadiene introduced. In a second stage, in which the formation of discrete rubbery-phase particles and phase inversion take place (the inversion step), polymerization is carried out to a conversion between 25 and 40 percent. By the use of shear forces, preferably by stirring, care is taken that the particle size is essentially maintained between 0.2 to 1.5 microns. The batch is subjected to a final polymerization in a manner known per se.

The preparation of the polybutadiene to be used according to the invention is known in the art (cf. for example, U.S. Pat. No. 3,868,434). 1,4-polybutadiene having at least 25 percent cis-content is particularly suitable, for example. The reduction of the polybutadiene solid rubber into smaller particles and its solution in the monomer present no principal difficulties.

In contrast to the pertinent methods of the state of the art, the solution of the rubber by the use of solvents such as toluene should be avoided.

According to the invention, care must be taken that the ratio of the monomers is so chosen within the specified limits that the index of refraction of the resulting hard phase is equalized with that of the polybutadiene; this is attainable by one skilled in the art in the ordinary manner without special effort. Graft-active initiators specifically suited for the method according to the present invention of the type whose decomposition forms tert.-butyloxy radicals or phenyl radicals, i.e. free radical forming agents which contain a tert.-butyl group or a group which on decomposition liberates a phenyl radical, are known in the art. Principally, these are peroxy compounds such as tert.-butyl perneodecanoate and/or dibenzoyl peroxide and/or tert.-butyl perbenzoate. The amount of graft-active initiators is kept within limits known in the art, for example from 0.02 to 1 percent by weight of the monomer.

Initiator can also be added as needed in the following method step. This is primarily necessary if one has conducted the reaction—as will be often the case when intermediate storage of the syrup—is intended that the initiator at the end of a given polymerization stage is completely decomposed, which—as known—is the case after 10 half-lifetimes. The necessary correlation of the amount of initiator with the polymerization temperature, which in the first and second stages is as a rule in the region between 80° C. and 150° C., is possible using measurements made by the processor himself, using information provided by the manufacturers of peroxides, and/or from the literature (e.g. J. Brandrup and E. H. Immergut, "Polymer Handbook", Wiley-Interscience, 1975).

The length of the first polymerization step is determined by the characteristic feature that, in this first step, a conversion is to be attained which corresponds with from one to two times the amount by weight of the polybutadiene introduced.

A controlled graft polymerization takes place in this first polymerization step. According to the invention, further chain transfer agents may be added during the polymerization, including the beginning of the final polymerization. Chain transfer agents suitable for this purpose are known (cf. "Polymer Handbook", loc. cit.) The use of tert.-dodecyl mercaptan has proved to be particularly suitable, as has that of alkyl mercaptans in general.

The total amount of chain transfer agent employed in all stages is in general from 0.2 to 1.0 percent, by weight of the monomers. The method according to the invention can be performed in such a way, for example, that polybutadiene rubber is first optionally reduced in size and dissolved with stirring in the monomers.

The third or final step, in which polymerization is concluded by reaching a monomer conversion greater than 80 percent, and preferably near 100 percent, is preferably carried out with the polymer in a film bag or tube according to Belgian Pat. No. 695,342 at a temperature which is usually between 30° C. and 60° C. The polymerization time is from 10 to 30 hours. The product may subsequently be tempered or post-heated for 2 to 12 hours at a temperature above the glass transition temperature, as a rule, between 100° C. and 120° C.

Alternatively, the third polymerization step can be performed as a suspension polymerization over a period of 1 to 5 hours at a temperature from 70° C. to 90° C.

The addition of chain transfer agent to the batch in the third polymerization stage is optional.

A better understanding of the present invention and of its many advantages will be evident from the following specific Examples, given by way of illustration.

EXAMPLE 1

Batch:

245 g of polybutadiene ($n_D^{20}=1.519$), 3255 g of a mixture of 2376 g of methyl methacrylate, 716 g of styrene, and 163 g of ethyl acrylate. (Total batch weight: 3.5 kg).

First Stage

The polymerization is carried out in a four liter flask equipped with a paddle stirrer (500 rpm) at 80° C. using
 3.5 g of tert.-butyl perneodecanoate* as an initiator and
 10.5 g of tert.-dodecyl mercaptan as a chain transfer agent.

*with substantially equivalent results 0.1 g tertiary-butyl perbenzoate may be used at 100° C. instead of tert.-butyl perneodecanoate.

Conversion: 10 percent in 25 minutes.

The composition of the solution is so chosen that the resulting polymer has the same index of refraction as the rubber.

Second Stage

Same reaction vessel as is employed in the first stage. 17.5 g of lauroyl peroxide are added and the polymerization is continued at 80° C.

The conversion at the end of this step is 33 percent after about one hour of reaction time.

Stirring is carried out at a constant number of revolutions of 500 rpm (the velocity of stirring is to be chosen and adjusted accordingly to the form of the stirrer, the dimensions of the vessel being stirred, and the molecular weight of the rubber). The average size of the particles produced by stirring was 1 micron, determined with electron optics.

Third Stage

After the addition of 3.5 g of tert.-dodecyl mercaptan as a chain transfer agent, the syrup is filled into film bags and polymerization is carried out for a further 24 hours at 53° C., followed by a tempering (postpolymerization) for 10 hours at 110° C.*)

)*The content of residual monomer at the end of the third stage was <1% which amounts to >99% conversion.

The amount of chain transfer agent used is advantageous for adjusting the melt viscosity, which is important for further working up.

Depending on the nature and amount of the initiator added in the prior stages and on the thickness of the layer of material being polymerized, the polymerization conditions used in the third stage may deviate from what is shown in this and the following Example. Working up of the molding material prepared according to the aforementioned Example gives molded pieces and films of high transparency and high shine.

| Mechanical Properties | | | | |
|---|---|---|---|---|
| Impact Resistance[1] (kilojoules/m²) | Notch Impact Resistance[1] (kilojoules/m²) | Gardner Impact Strength[2] (inch lbs/mil) | $\eta_s 220/5$[3] (Newton seconds/m²) | Vicat Softening Temperature[4] (°C.) |
| 87* | 7.9 | 1.07 | 1000 | 97 |

[1]According to DIN 53 453
[2]According to ASTM D 1238
[3]According to DIN Proposal 54811
[4]According to DIN 53460
*Of a total of 10 test bodies employed, 9 remained unbroken.

EXAMPLE 2

(Continuous Performance of the First and Second Stage in a Cascade of Stirred Vessels)

Batch:

Monomer ratio and polybutadiene concentration correspond to that in Example 1.

First Stage

The first stage is carried out in a four liter vessel with the addition of
 0.3% of tert.-deodecyl mercaptan and
 0.05% of tert.-butyl perneodecanoate at 110° C. and with a dwell time of 17 minutes.

Conversion=8.5 percent.

Second Stage

The syrup obtained in this manner is continuously polymerized in the second stage at 100° C. in a 15 liter stirred vessel under pressure (about 5 atmospheres) and with the addition of 0.04% of tert.-butyl perneodecanoate. The stirred vessel is equipped with a paddle stirrer having a diameter of 17 cm. At a rate of revolution of 270 rpm and a dwell time of 60 minutes, a syrup is obtained with about 30 percent conversion to the hard phase. The average particle size is 0.6 micron. The syrup is cooled in a heat exchanger.*)

*) By the treatment in the first and second stayes the initiator is completely decomposed.

Third Stage

The syrup is polymerized to completion in a third stage under the conditions given for the third stage of Example 1. Conversion >99%.

| Mechanical Properties | | | | |
|---|---|---|---|---|
| Impact Resistance[1] (kilojoules/m²) | Notch Impact Resistance[1] (kilojoules/m²) | Gardner Impact Strength[2] (inch lbs/mil) | $\eta_s 220/5$[3] (Newton seconds/m²) | Vicat Softening Temperature[4] (°C.) |
| 72* | 0.7 | 0.96 | 1100 | 97 |

*of a total of 10 test bodies employed, 8 remained unbroken.

What is claimed is:

1. A method for making a transparent impact-resistant polymer comprising a rubbery phase of grafted polybutadiene and a hard copolymer phase, which polymer is adaptable to use as a molding material, which method comprises:

(1) in a first polymerization stage, dissolving a solid polybutadiene rubber in a monomer mixture comprising (a) methyl methacrylate, (b) styrene, and (c) at least one of methyl acrylate or ethyl acrylate to give a solution containing from 3 to 10 percent by weight of said rubber, and then polymerizing the solution using an initiator promoting graft copolymerization and in the presence ab initio of a chain transfer agent until an amount of said monomer mixture which is one to two times the weight of said polybutadiene rubber introduced is converted, said monomers (a), (b), and (c) being present in said monomer mixture in a ratio by weight of $(73\pm5):(22\pm2):(5\pm3)$ such that the index of refraction of the hard polymer phase produced by the polymerization is equal to that of said polybutadiene, and said initiator being one forming tertiary-butoxy or phenyl free-radicals on decomposition;

(2) in a second stage, further polymerizing to a monomer conversion between 25 and 40 percent while stirring to subject the resulting polymer to shear forces producing polymer particles having an average diameter between 0.2 micron and 1.5 microns; and (3) in a third stage, further polymerizing to a monomer conversion greater than 80 percent.

2. A method as in claim 1 wherein said initiator is selected from the group consisting of tertiary-butyl perneodecanoate and tertiary-butyl perbenzoate.

3. A method as in claim 1 wherein said chain transfer agent is added portionwise throughout the method, including at the beginning of the third stage.

4. A method as in claim 3 wherein the total amount of chain transfer agent added is from 0.2 to 1 percent by weight of the monomer mixture.

5. A method as in claim 1 wherein said chain transfer agent is an alkyl mercaptan.

6. A method as in claim 2 wherein said monomer ratio (a):(b):(c) is 73:22:5.

7. A method as in claim 1 wherein, in each of the first and second stages, the intiator is completely decomposed prior to the succeeding stage.

8. A method as in claim 1 wherein polymerization is carried out in the third stage to a monomer conversion near 100 percent.

9. A transparent impact resistant polymer made by the method of claim 1.

* * * * *